(12) United States Patent
Hou

(10) Patent No.: US 11,153,653 B2
(45) Date of Patent: Oct. 19, 2021

(54) RESOURCE RECOMMENDATION METHOD, DEVICE, APPARATUS AND COMPUTER READABLE STORAGE MEDIUM

(71) Applicant: BAIDU ONLINE NETWORK TECHNOLOGY (BEIJING) CO., LTD., Beijing (CN)

(72) Inventor: Baicen Hou, Beijing (CN)

(73) Assignees: BAIDU ONLINE NETWORK TECHNOLOGY (BEIJING) CO., LTD.; SHANGHAI XIAODU TECHNOLOGY CO. LTD.

(*) Notice: Subject to any disclaimer, the term of this patent is extended or adjusted under 35 U.S.C. 154(b) by 15 days.

(21) Appl. No.: 16/563,225

(22) Filed: Sep. 6, 2019

(65) Prior Publication Data
US 2019/0394529 A1 Dec. 26, 2019

(30) Foreign Application Priority Data
Dec. 10, 2018 (CN) .......................... 201811502921.2

(51) Int. Cl.
*H04N 21/466* (2011.01)
*H04N 21/431* (2011.01)
(Continued)

(52) U.S. Cl.
CPC ......... *H04N 21/4667* (2013.01); *G10L 15/22* (2013.01); *H04N 21/42203* (2013.01);
(Continued)

(58) Field of Classification Search
CPC .......... H04N 21/4667; H04N 21/4316; H04N 21/42203; H04N 21/4722; H04N 21/4668;
(Continued)

(56) References Cited

U.S. PATENT DOCUMENTS

| 6,438,752 B1 * | 8/2002 | McClard | H04N 7/163 |
| | | | 348/731 |
| 2007/0033007 A1 * | 2/2007 | Narahara | H04N 21/4826 |
| | | | 704/9 |

(Continued)

FOREIGN PATENT DOCUMENTS

| CN | 104376021 A | 2/2015 |
| CN | 104391999 A | 3/2015 |

(Continued)

OTHER PUBLICATIONS

Huan-Yu Lin, Jun-Ming Su, Yi-Li Liu, Jin-Long Li, Shian-Shyong Tseng and Shien-Chang Tang, "OSCAR: an Online Scalable Adaptive Recommender for improving the recommendation effectiveness of entertainment video webshop," 2010 3rd Intl Conf on Comp Sci and Infor Tech, Chengdu, China, 2010, pp. 69-77, doi (Year: 2010).*

(Continued)

*Primary Examiner* — Cynthia M Fogg
(74) *Attorney, Agent, or Firm* — Dilworth IP, LLC

(57) ABSTRACT

Embodiments of the present disclosure provide a resource recommendation method, device, apparatus, and computer readable storage medium. The method in the embodiment of the present disclosure allows for acquiring, according to a resource type of a first resource that has been provided to a first user, recommendable content categories corresponding to the resource type and a recommendation weight of each of the content categories, determining, according to the recommendation weight of each of the content categories, a target category to be recommended, and recommending a second resource under the target category to the first user, so that different recommendable content categories flexibly correspond to a different resource type, and recommendation weights are flexibly set for the recommendable content categories corresponding to the different resource type.

18 Claims, 5 Drawing Sheets

(51) Int. Cl.
*H04N 21/422* (2011.01)
*H04N 21/4722* (2011.01)
*G10L 15/22* (2006.01)

(52) U.S. Cl.
CPC ..... *H04N 21/4316* (2013.01); *H04N 21/4722* (2013.01); *G10L 2015/223* (2013.01)

(58) Field of Classification Search
CPC ......... H04N 21/4826; H04N 21/44222; H04N 21/4532; H04N 21/6582; G10L 15/22; G10L 2015/223
USPC .......................................................... 725/34
See application file for complete search history.

(56) References Cited

U.S. PATENT DOCUMENTS

| | | | |
|---|---|---|---|
| 2008/0022307 A1* | 1/2008 | Jeong | H04N 21/4667 725/44 |
| 2008/0319833 A1* | 12/2008 | Svendsen | H04L 12/1822 705/7.29 |
| 2010/0229190 A1* | 9/2010 | Koo | H04N 21/4524 725/14 |
| 2012/0291072 A1* | 11/2012 | Maddison | G06F 16/9537 725/53 |
| 2013/0204825 A1* | 8/2013 | Su | G06N 5/04 706/46 |
| 2015/0161238 A1* | 6/2015 | Son | G06F 3/167 707/728 |
| 2016/0078489 A1* | 3/2016 | Hu | G06Q 50/01 705/14.66 |
| 2017/0026705 A1* | 1/2017 | Yeh | G06F 16/3329 |
| 2017/0134776 A1* | 5/2017 | Ranjeet | G11B 27/031 |
| 2017/0195731 A1* | 7/2017 | Girlando | H04N 21/4668 |

FOREIGN PATENT DOCUMENTS

| | | |
|---|---|---|
| CN | 107818166 A | 3/2018 |
| CN | 108628886 A | 10/2018 |
| CN | 108769725 A | 11/2018 |

OTHER PUBLICATIONS

First Office Action issued in CN Patent Application No. 201811502921.2 dated Jul. 15, 2020.

* cited by examiner

RESOURCE RECOMMENDATION METHOD, DEVICE, APPARATUS AND COMPUTER READABLE STORAGE MEDIUM

CROSS-REFERENCE TO RELATED APPLICATION

This application claims priority to Chinese Patent Application No. 201811502921.2, filed on Dec. 10, 2018, which is hereby incorporated by reference in its entirety.

TECHNICAL FIELD

Embodiments of the present disclosure relate to the field of communication technologies, and in particular, to a resource recommendation method, device, apparatus and computer readable storage medium.

BACKGROUND

Current multimedia platforms, such as a video playing website and the like, provide users with target resources required by the users, and when performing a satisfied recommendation, generally recommend the users with the same type of resources having high similarity, a high score, or a high click rate in relative to the target resources as well surrounding resources of the target resources. For example, for a resource such as a deductive reasoning movie, the playing website will recommend the users with other movies that the starring actors participate in, a movie ranklist ordered by click rate or rating, and peripheral resources such as an interesting sidelight of the movie, the starring interview, and the like.

However, the users, after obtaining satisfaction from the target resources, do not necessarily want to continue to view the same type of resources or surrounding resources having high similarity to the target resource. For example, after the users have finished watching a deductive reasoning movie, the most urgent need is usually to see a detailed film review or plot analysis of the deductive reasoning movie, rather than other deductive reasoning movies. The existing resource recommendation method is not flexible enough to meet the users' requirements.

SUMMARY

The embodiments of the present disclosure provide a resource recommendation method, device and apparatus and computer readable storage medium, which are used to solve the problem that the existing resource recommendation method is not flexible enough to meet the users' requirements.

An aspect of the embodiments of the present disclosure provides a resource recommendation method, including:

acquiring, according to a resource type of a first resource provided to a first user, recommendable content categories corresponding to the resource type and a recommendation weight of each of the content categories;

determining, according to the recommendation weight of each of the content categories, a target category to be recommended; and recommending, to the first user, a second resource under the target category.

Another aspect of the embodiments of the present disclosure provides a resource recommendation device, including:

an acquiring module, configured to acquire, according to a resource type of a first resource provided to a first user, recommendable content categories corresponding to the resource type and a recommendation weight of each of the content categories;

a determining module, configured to determine, according to the recommendation weight of each of the content categories, a target category to be recommended; and a recommendation module, configured to recommend, to the first user, a second resource under the target category.

Another aspect of the embodiments of the present disclosure provides a resource recommendation apparatus, including:

a memory, a processor, and a computer program stored on the memory and operable on the processor, where the processor, when running the computer program, implements the resource recommendation method described above.

Another aspect of the embodiments of the present disclosure provides a computer readable storage medium having a computer program stored thereon, where the computer program, when executed by a processor, implements the resource recommendation method described above.

The resource recommendation method, device, apparatus, and computer readable storage medium provided in the embodiments of the present disclosure allow for acquiring, according to a resource type of a first resource that has been provided to a first user, recommendable content categories corresponding to the resource type and a recommendation weight of each of the content categories, determining, according to the recommendation weight of each of the content categories, a target category to be recommended, and recommending a second resource under the target category to the first user, so that different recommendable content categories flexibly correspond to a different resource type, and recommendation weights are flexibly set for the recommendable content categories corresponding to the different resource type, thus it is possible to flexibly recommended different content categories of the second resource to the user according to the resource type of the first resource currently provided to the user, to better meet the user's requirements and improve user experience.

Specific embodiments of the present disclosure have been clearly shown from the above drawings, which will be described in more details later. These drawings and texts are not intended to limit the scope of the embodiments of the present disclosure in any way, but to explain concepts of the present disclosure to those skilled in the art with reference to the specific embodiments.

DESCRIPTION OF EMBODIMENTS

Exemplary embodiments will be described in detail herein, examples of which are illustrated in the accompanying drawings. When the following description relates to the accompanying drawings, the same number in different drawings represents the same or similar elements unless otherwise indicated. Implementations described in the following exemplary embodiments do not represent all implementations consistent with the present disclosure. Instead, they are merely device and method examples that are consistent with aspects of the present disclosure as detailed in the appended claims.

The terms, such as "first", "second" and the like, which are used in the embodiments of the present disclosure, are used for the purpose of description, and cannot be construed as indicating or implying relative importance or implicitly indicating the number of technical features indicated. In the following description of the embodiments, the meaning with regard to "a plurality of" indicates two or more unless specifically defined otherwise.

The following specific embodiments may be combined with each other, and the same or similar concepts or processes may not be described in some embodiments.

Embodiments of the present disclosure will be described below with reference to the accompanying drawings.

Embodiment 1

Figure 1:
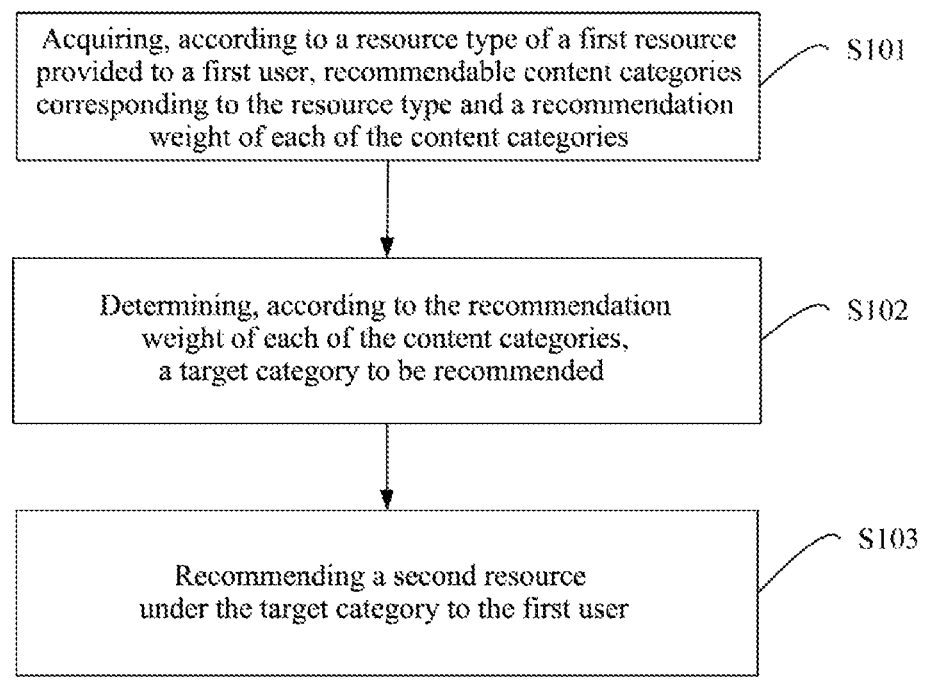
FIG. 1 is a flowchart of a resource recommendation method according to Embodiment 1 of the present disclosure.

FIG. 1 is a flowchart of a resource recommendation method according to Embodiment 1 of the present disclosure. The embodiment of the present disclosure provides a resource recommendation method directing at the problem that the existing resource recommendation method is not flexible enough to meet users' requirements.

The method in the present embodiment is applied to a computer device of a multimedia platform such as a video playing platform, a music playing platform, and a reading platform. In other embodiments, the method is also applicable to other devices. In this embodiment, a terminal device is taken as an example for illustration.

In the present embodiment, a multimedia platform sets corresponding recommendable content categories for a different resource type according to behaviors of most users upon usage of a resource under the resource type, and sets different recommendation weights for the recommendable content categories of the resource type. The greater a recommendation weight of a content category, it indicates that the more resources a user needs for the content category upon usage of the resource under the resource type.

The present embodiment has an application scenario where: a multimedia platform has provided a first resource to a first user according to a request of the user, and on the basis that the first resource is provided to the first user, recommends, according to recommendable content categories corresponding to a resource type of the first resource and a recommendation weight of each of the content categories, a second resource having several content categories with the highest recommendation weight to the first user, that is, provides a resource that is more needed by the user to the user.

As shown in FIG. 1, the method has specific steps as follows:

Step S101, acquiring, according to a resource type of a first resource provided to a first user, recommendable content categories corresponding to the resource type and a recommendation weight of each of the content categories.

In the present embodiment, the first user may be any user who is currently using the multimedia platform. The first resource is a resource currently provided by the multimedia platform to the first user. The first resource may be a resource such as video, music, novel, etc.

The resource type of the first resource may include a first-level category, and a second-level category included in the first-level category, and the like. For example, the first-level category of the resource may be a movie, and the second-level category may be deductive reasoning, or series.

The higher the level of the resource type of the first resource, the more detailed the division of the resource type. Levels included in the resource type in this embodiment and types included in each level may be set by technical personnel according to an actual application scenario and experience, which is not specifically limited herein.

In the present embodiment, a different resource type may correspond to different recommendable content categories and recommendation weights of the content categories. For each resource type, historical behavior data of users who have used a resource under the resource type may be acquired, and the historical behavior data includes information of a next resource accessed by the users upon usage of the resource under the resource type. According to these historical behavior data, content categories of a next resource that the users may need to access upon usage of the resource under the resource type may be counted to obtain content categories to be recommended, and recommendation weights of the content categories to be recommended may be counted. The more the users that access the next resource for a certain content category, the greater the recommendation weight of the content category, indicating that the more resources a user needs for the content category upon usage of the resource under the resource type.

Optionally, the second resource may be one of or a combination of the following information: audio, video, text content, picture collection, and the like, which are not specifically limited herein.

Optionally, the multimedia platform may pre-acquire recommendable content categories corresponding to each resource type and a recommendation weight of each of the content categories, and store them locally. In this step, the multimedia platform may locally acquire recommendable content categories corresponding to a resource type of a first resource that has been stored and a recommendation weight of each of the content categories.

For example, the resource type includes at least movie and music, and recommendable content categories corresponding to the resource type of movie may include: movie review, plot analysis, edited highlight, conference video, promotional video, related hotspot video, and the like; recommendable content categories corresponding to the resource types of music may include: song review, lyric analysis, cover audio, adapted audio, concert version of audio, and the like.

Further, the movie is a first-level category, and its second-level category includes at least deductive reasoning and series. If the resource type of the first resource includes the first-level category: movie, and the second-level category: deductive reasoning, then a recommendation weight for plot analysis in the recommendable content categories may be configured to be higher, and the plot analysis is preferentially recommended to the user. If the resource type of the first resource includes the first-level category: movie and the second-level category: series, then a recommendation weight for edited highlight in the recommendable content categories may be configured to be higher, and the edited highlight may be preferentially recommended to the user, for example, "Edited Highlights for Protagonist's Whole Life" and the like.

Step S102, determining, according to the recommendation weight of each of the content categories, a target category to be recommended.

In this step, according to the recommendable content categories corresponding to the resource type of the first resource and the recommendation weight of each of the content categories, several content categories with the highest recommendation weight are determined, and used as a target category recommended to the first user at this time.

Step S103, recommending a second resource under the target category to the first user.

After the target category to be recommended is determined, in this step, the multimedia platform acquires, according to attribute information of the first resource, a second resource that belongs to the target category related to the first resource, and recommends entry information of the second resource belonging to the target category to the first user, so that the user conveniently acquires the second resource through the entry information.

Among them, the second resource may be a resource that can be provided by the multimedia platform itself, or may be a resource of other platform, which is not specifically limited in this embodiment.

The attribute information of the first resource may include the resource name, the resource type, the creator, other information of the first resource, and the like, which is not specifically limited herein. The other resource related to the first resource may be other resource for a creation that the creator of the first resource participates in, comment information, content analysis information, preview information or promote information of the first resource, and a second adaptation of the first resource, or a different version of resource, and other related resource, and the like, which are not specifically limited herein.

Optionally, when the second resource under the target category is recommended to the first user, if a hotspot resource of the first resource is included in the second resource, the hotspot resource of the first resource is preferentially recommended to the first user, where the hotspot resource refers to a resource related to a hot event that occurs within a preset time period, for example, a video resource in which "Cast and Crew for Dream of Red Mansions" reunited in a variety show after several decades, where the preset time period can be set by technical personnel according to an actual application scenario and experience, and is not specifically limited in the present embodiment.

The embodiment of the present disclosure allows for acquiring, according to a resource type of a first resource that has been provided to a first user, recommendable content categories corresponding to the resource type and a recommendation weight of each of the content categories, determining, according to the recommendation weight of each of the content categories, a target category to be recommended, and recommending a second resource under the target category to the first user, so that different recommendable content categories flexibly correspond to a different resource type, and recommendation weights are flexibly set for the recommendable content categories corresponding to the different resource type, thus it is possible to flexibly recommended different content categories of the second resource to the user according to the resource type of the first resource currently provided to the user, to better meet the user's requirements and improve user experience.

Embodiment 2

Figure 2:
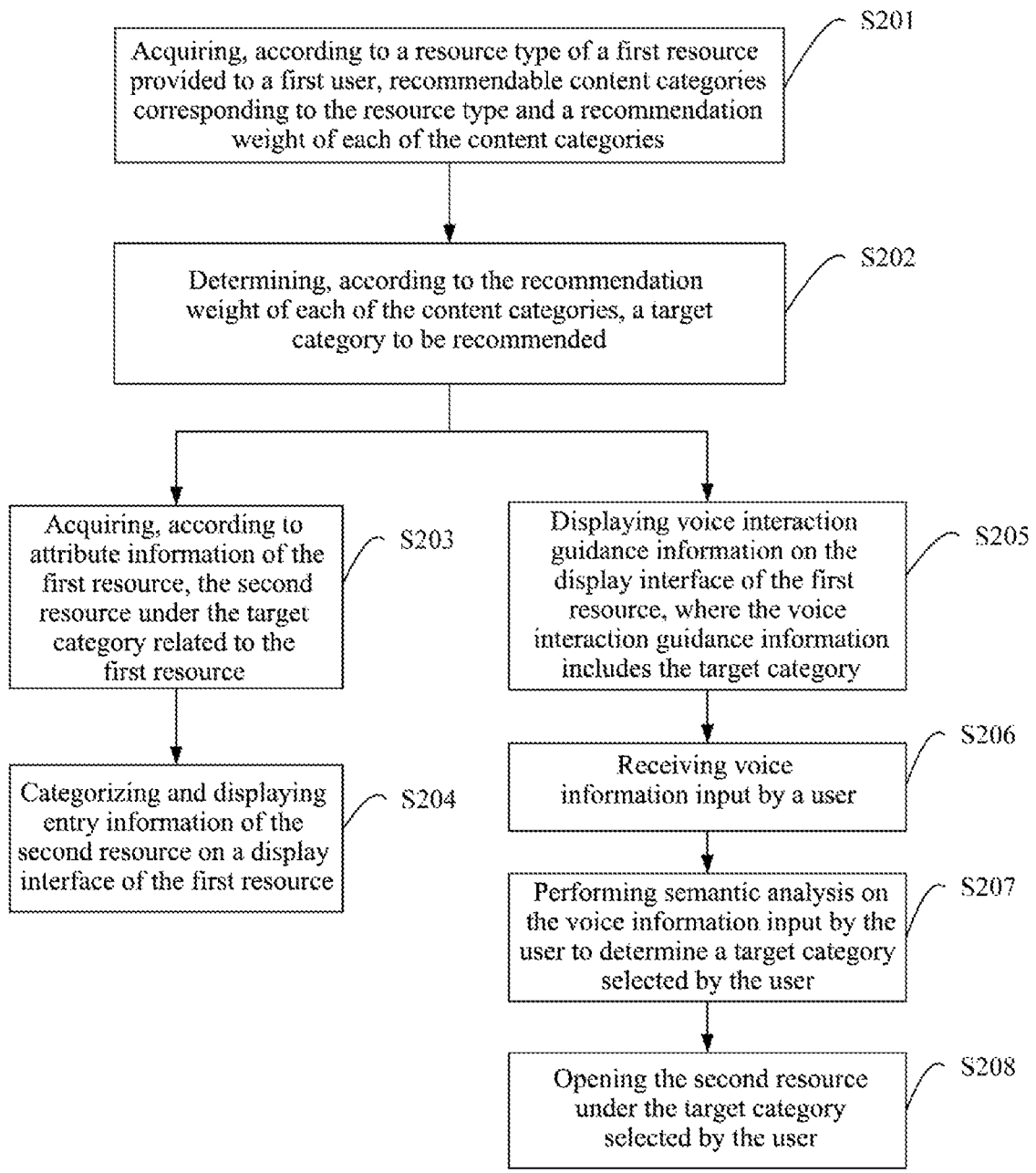
FIG. 2 is a flowchart of a resource recommendation method according to Embodiment 2 of the present disclosure.

FIG. 2 is a flowchart of a resource recommendation method according to Embodiment 2 of the present disclosure. On the basis of Embodiment 1 described above, in the present embodiment, the recommending a second resource under the target category to the first user may specifically include the following two implementations. One is to: acquire, according to attribute information of the first resource, the second resource under the target category related to the first resource; and categorize and display entry information of the second resource on a display interface of the first resource. The other is to: display voice interaction guidance information on the display interface of the first resource, where the voice interaction guidance information includes the target category; receive voice information input by a user; perform semantic analysis on the voice information input by the user to determine a target category selected by the user; and open the second resource under the target category selected by the user.

As shown in FIG. 2, the method has specific steps as follows:

Step S201, acquiring, according to a resource type of a first resource provided to a first user, recommendable content categories corresponding to the resource type and a recommendation weight of each of the content categories.

In the present embodiment, the first user may be any user who is currently using the multimedia platform. The first resource is a resource currently provided by the multimedia platform to the first user. The first resource may be a resource such as video, music, novel, etc.

The resource type of the first resource may include a first-level category, and a second-level category included in the first-level category, and the like. For example, the first-level category of the resource may be a movie, and the second-level category may be deductive reasoning, or series.

The higher the level of the resource type of the first resource, the more detailed the division of the resource type. Levels included in the resource type in this embodiment and types included in each level may be set by technical personnel according to an actual application scenario and experience, which is not specifically limited herein.

In the present embodiment, a different resource type may correspond to different recommendable content categories and recommendation weights of the content categories. For each resource type, historical behavior data of users who have used a resource under the resource type may be acquired, and the historical behavior data includes information of a next resource accessed by the users upon usage of the resource under the resource type. According to these historical behavior data, content categories of a next resource that the users may need to access upon usage of the resource under the resource type may be counted to obtain content categories to be recommended, and recommendation weights of the content categories to be recommended may be counted. The more the users that access the next resource for a certain content category, the greater the recommendation weight of the content category, indicating that the more resources a user needs for the content category upon usage of the resource under the resource type.

Optionally, the multimedia platform may pre-acquire recommendable content categories corresponding to each resource type and a recommendation weight of each of the content categories, and store them locally. In this step, the multimedia platform may locally acquire recommendable content categories corresponding to a resource type of a first resource that has been stored and a recommendation weight of each of the content categories.

Step S202, determining, according to the recommendation weight of each of the content categories, a target category to be recommended.

In this step, according to the recommendable content categories corresponding to the resource type of the first resource and the recommendation weight of each of the content categories, several content categories with the highest recommendation weight are determined, and used as a target category recommended to the first user at this time.

In the present embodiment, this step may be specifically implemented as follows:

acquiring, according to the resource type of the first resource provided to the first user, historical behavior data of a second user who has used the resource under the resource type; determining, according to the historical behavior data of the second user, content categories selected by the second user upon each usage of the resource under the resource type to obtain the recommendable content categories corresponding to the resource type; and determining, according to the number of times the second user selects each of the content categories, the recommendation weight of each of the content categories.

In further, the determining, according to the recommendation weight of each of the content categories, a target category to be recommended may use a manner of:

determining, according to the recommendation weight of each of the content categories, a content category whose recommendation weight is greater than a weight threshold as the target category to be recommended, where the weight threshold may be set by technical personnel according to experience, and is not specifically limited herein.

The determining, according to the recommendation weight of each of the content categories, a target category to be recommended may use another manner of:

determining, according to the recommendation weight of each of the content categories, a preset number of content categories with the highest recommendation weight as the target category to be recommended, where the preset number can be set by technical personnel according to experience, and is not specifically limited herein.

Optionally, this step may be specifically implemented as follows:

acquiring historical behavior data of the first user according to the resource type of the first resource provided to the first user; determining, according to the historical behavior data of the first user, content categories of a next resource selected by the first user upon each usage of the resource under the resource type to obtain the recommendable content categories corresponding to the resource type; and determining the recommendation weight of each of the content categories according to the number of times the first user selects each of the content categories.

Optionally, this step may be specifically implemented as follows:

acquiring historical access data of the first resource according to the resource type of the first resource provided to the first user; determining, according to the historical access data of the first resource, content categories of a next resource selected by the user upon each usage of the first resource to obtain the recommendable content categories corresponding to the resource type of the first resource; and determining the recommendation weight of each of the content categories according to the number of times the first user selects each of the content categories so that a targeted recommendation can be made for the first resource.

The acquired historical behavior data and historical access data may include behavior data or access data that is not actively operated by the user, for example, automatically playing a next video and the like. Optionally, in this embodiment, the historical behavior data and the historical access data may be subject to data cleaning, and the behavior data or the access data that is not actively operated by the user is removed, so that the recommendation weight of each of the content categories is more relevant to subjective needs of the user.

Optionally, the determining, according to the recommendation weight of each of the content categories, a target category to be recommended may further include:

determining, according to an online time of the first resource, whether the first resource is online; if the first resource is not online and the target category does not include a preview category, determining a recommendation weight of the preview category according to a maximum value of the recommendation weight of the target category so that the preview category becomes a content category with the highest recommendation weight among target categories of the first resource; and using the preview category as the target category to be recommended. If the first resource is online, no special processing is performed.

For example, a movie has just been released, and there is currently no online resource. At this time, a trailer is recommended preferentially.

Step S203, acquiring, according to attribute information of the first resource, the second resource under the target category related to the first resource.

After the target category to be recommended is determined, in this step, the multimedia platform acquires, according to attribute information of the first resource, the second resource that belongs to the target category related to the first resource, and recommends entry information of the second resource belonging to the target category to the first user, so that the user conveniently acquires the second resource through the entry information.

Among them, the second resource may be a resource that can be provided by the multimedia platform itself, or may be a resource of other platform, which is not specifically limited in this embodiment.

The attribute information of the first resource may include the resource name, the resource type, the creator, other information of the first resource, and the like, which is not specifically limited herein. The other resource related to the first resource may be other resource for a creation that the creator of the first resource participates in, comment information, content analysis information, preview information or promote information of the first resource, a second adaptation of the first resource, or a different version of resource, and other related resource, and the like, which are not specifically limited herein.

Step S204, categorizing and displaying entry information of the second resource on a display interface of the first resource.

Specifically, displaying of eye-catching entry information is increased in the display interface of the first resource.

Optionally, the categorizing and the displaying the entry information of the second resource in the display interface of the first resource may be implemented as follows:

determining, according to size of recommendation weights of content categories of the second resource, displaying areas of the content categories of the second resource in the display interface, where a displaying area of a content category having a higher recommendation weight is placed at the front; and displaying, in a corresponding displaying area, the entry information of the second resource under different content categories.

Among them, in the present embodiment, the displaying areas corresponding to the content categories may vary in size, and entry information of the second resource displayed in the displaying areas corresponding to the content categories may also vary in quantity.

Figure 3:
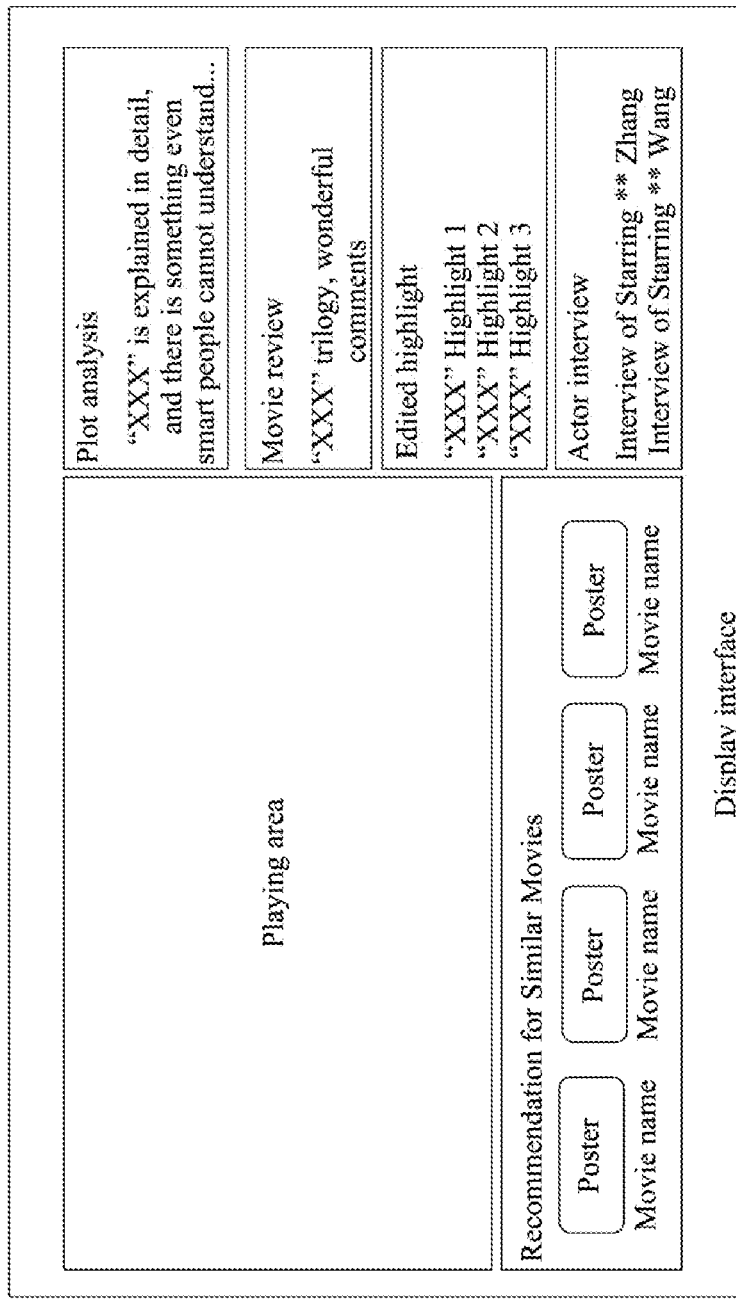
FIG. 3 is a schematic diagram of displaying areas of content categories according to Embodiment 2 of the present disclosure.

For example, by taking an example where four content categories including "plot analysis", "movie review", "interesting sidelight", and "actor interview" are displayed in the displaying areas, FIG. 3 exemplarily shows a display manner in which the entry information of the second resource is categorized and displayed on the display interface of the first resource. In addition, FIG. 3 is described by simply taking an example in which the displaying areas corresponding to the content categories are arranged on the right side of the playing area, and the displaying areas of the content categories may be arranged in other areas beyond the playing area of the display interface, which are not specifically limited herein.

Optionally, the categorizing and the displaying entry information of the second resource on a display interface of the first resource may also be implemented as follows:

adding, a content category identifier to the entry information of the second resource according to the content categories of the second resource; and displaying the entry information of the second resource in the display interface of the first resource.

For example, a corner mark of a corresponding content category may be added to a thumbnail displayed in the entry information of the second resource, and corner marks of different content categories are different.

For example, a common character (such as "H") for a content category may be added to the original title in the entry information of the second resource, and the content category of the resource resides in the common character. For example, the displayed title of the second resource may be similar to the following: "[Content category]—Original Title" such as: [Interview]—"xxx" Creators in Talk Show, [trailer]—"xxx" First Version of Trailer, and the like.

Optionally, the entry information of the second resource may be displayed in a preset eye-catching position through a striking color, font, picture, or the like, or through a dynamic manner such as a floating window.

Optionally, the entry information of the second resource is displayed by way of a first-level entry, where the first-level entry is entry information that can jump to the second resource by an operation of one time selection.

In addition, in the displaying area of each of the content categories, after the ranking is performed according to the degree of relevance to the first resource, the click rate, the rating, and the like, the each of the content categories is displayed in a displaying area corresponding to the categorized content. In further, entry information of several second resources ranked at the top is displayed according to size of the displaying area corresponding to the categorized content; or entry information of a specified number of second resources is displayed in the displaying area corresponding to the categorized content, and a "more" option is displayed, so that the user clicks the "more" option to view entry information of more second resources under the content category. The specified number can be set by technical personnel according to a layout of the display interface, which is not specifically limited herein.

Steps S203-S204 described above illustrate a process for recommending the second resource under the target category to the first user by way of adding an eye-catching entry.

Step S205, displaying voice interaction guidance information on the display interface of the first resource, where the voice interaction guidance information includes the target category.

In the present embodiment, for a platform with an intelligent voice interaction function, such as a smart speaker, and the like, the second resource under the target category may be recommended to the first user by way of voice interaction.

Specifically, the voice interaction guidance information may be displayed on the display interface of the first resource, and the voice interaction guidance information may be displayed below the playing area or at another eye-catching position so that the user can easily find the voice interaction guidance information and select the target category to be recommended over voice according to the voice interaction guidance information.

Figure 4:
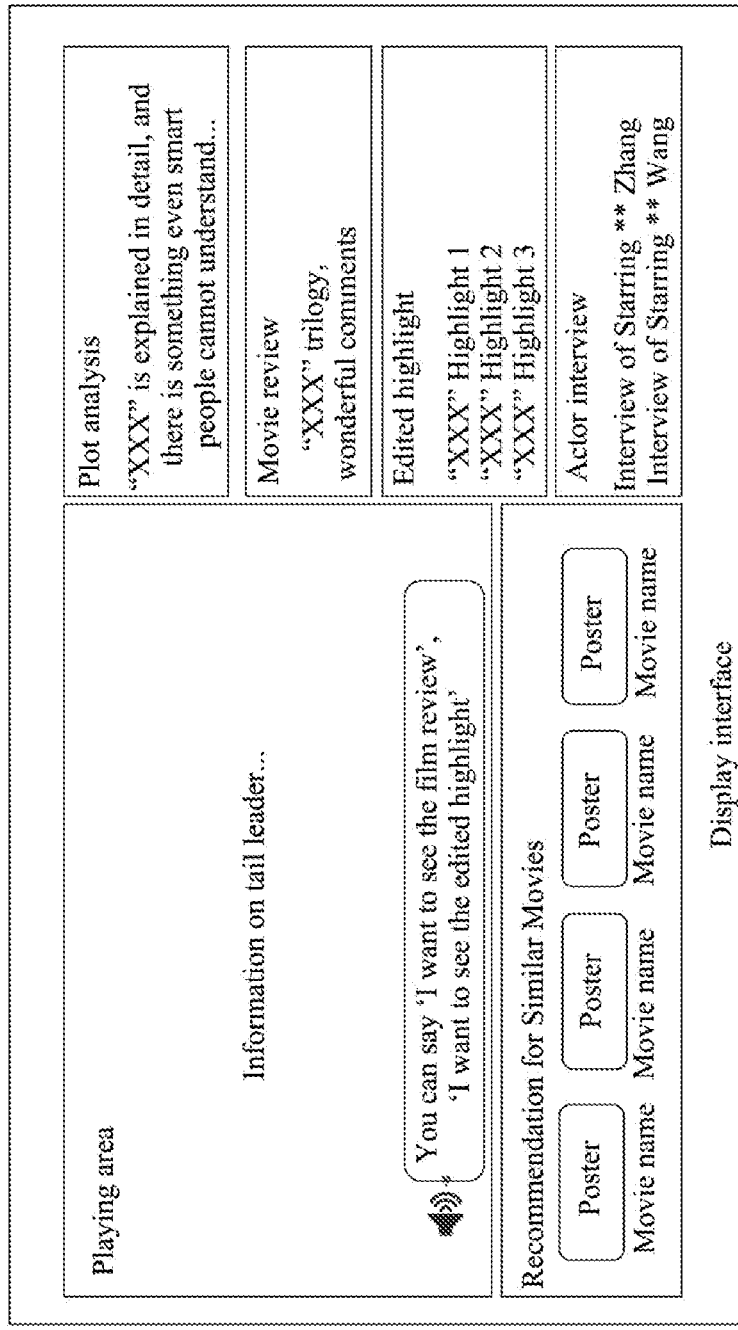
FIG. 4 is a schematic diagram of displaying voice interaction guidance information according to Embodiment 2 of the present disclosure.

For example, as shown in FIG. 4, the following voice interaction guidance information can be displayed below the playing area: "You can say 'I want to see the film review', 'I want to see the edited highlight'.

Optionally, in order to avoid affecting the user's usage of the first resource, the voice interaction guidance information may be displayed starting from a point when the playing of the first resource goes into the tail portion.

Step S206, receiving voice information input by a user.

The voice information input by the user is received in real time in order to provide the second resource to the user in time.

Step S207, performing semantic analysis on the voice information input by the user to determine a target category selected by the user.

After the voice information input by the user is received, the target category included in the voice information is extracted by performing semantic analysis on the voice information.

Step S208, opening the second resource under the target category selected by the user.

According to the target category selected by the user, the second resource under the target category selected by the user can be directly opened. If there is a plurality of second resources under the target category selected by the user, the ranking may be performed according to the ratings or the click rates of the plurality of second resources and the first resources, and a second resource with the highest rating or the highest click rate may be opened.

Steps S205-S208 described above illustrate a process for recommending the second resource under the target category to the first user by way of voice interaction.

In the present embodiment, the foregoing Steps S203-S204 and Steps S205-S208 are respectively two feasible implementations for recommending the second resource under the target category to the first user, and the recommending the second resource under the target category to the first user may be implemented by using any one or both of the implementations.

In addition, in the present embodiment, when the second resource under the target category is recommended to the first user, if a hotspot resource of the first resource is included in the second resource, the hotspot resource of the first resource is preferentially recommended to the first user, where the hotspot resource refers to a resource related to a hot event that occurs within a preset time period, for example, a video resource in which "Cast and Crew for Dream of Red Mansions" reunited in a variety show after several decades, where the preset time period can be set by technical personnel according to an actual application scenario and experience, and is not specifically limited in the present embodiment.

The method provided in the present embodiment can not only meet a next requirement of a user based on a scenario, but also reduce costs of an input operation of the user and improve user experience. At the same time, the multimedia platform is allowed to have a new traffic distribution portal, which can reverse traffic to the target resource, thereby increasing commercial value of the multimedia platform.

The embodiment of the present disclosure can achieve that different recommendable content categories flexibly correspond to a different resource type, and recommendation weights are flexibly set for the recommendable content categories corresponding to the different resource type, thus it is possible to flexibly recommended different content categories of the second resource to the user according to the resource type of the first resource currently provided to the user, moreover, when the second resource is recommended to the user, the second resource under content categories with great recommendation weights is displayed in a displaying area placed at the front, and/or the second resource is categorized and displayed by way of adding a content category identifier to entry information, so that the user can obtain the required second resource. In addition, providing the second resource to the user by way of voice interaction is more convenient and improves user experience.

Embodiment 3

Figure 5:
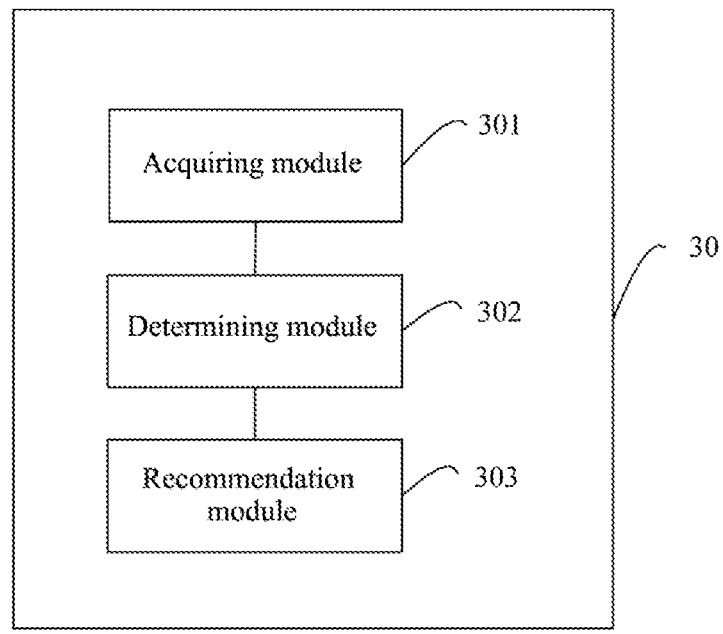
FIG. 5 is a schematic structural diagram of a resource recommendation device according to Embodiment 3 of the present disclosure.

FIG. 5 is a schematic structural diagram of a resource recommendation device according to Embodiment 3 of the present disclosure. The resource recommendation device provided in the embodiment of the present disclosure may perform the processing procedure provided in the resource recommendation method embodiment. As shown in FIG. 5, the resource recommendation device 30 includes: an acquiring module 301, a determining module 302 and a recommendation module 303.

Specifically, the acquiring module 301 is configured to acquire, according to a resource type of a first resource provided to a first user, recommendable content categories corresponding to the resource type and a recommendation weight of each of the content categories.

The determining module 302 is configured to determine, according to the recommendation weight of each of the content categories, a target category to be recommended.

The recommendation module 303 is configured to recommend a second resource under the target category to the first user.

The device provided in the embodiment of the present disclosure may be specifically used to perform the method embodiment provided in the foregoing Embodiment 1, and specific functions are not described herein again.

The embodiment of the present disclosure allows for acquiring, according to a resource type of a first resource that has been provided to a first user, recommendable content categories corresponding to the resource type and a recommendation weight of each of the content categories, determining, according to the recommendation weight of each of the content categories, a target category to be recommended, and recommending a second resource under the target category to the first user, so that different recommendable content categories flexibly correspond to a different resource type, and recommendation weights are flexibly set for the recommendable content categories corresponding to the different resource type, thus it is possible to flexibly recommended different content categories of the second resource to the user according to the resource type of the first resource currently provided to the user, to better meet the user's requirements and improve user experience.

Embodiment 4

On the basis of the foregoing Embodiment 3, in the present embodiment, the acquiring module is further configured to:

acquire, according to the resource type of the first resource provided to the first user, historical behavior data of a second user who has used a resource of the resource type; determine, according to the historical behavior data of the second user, content categories selected by the second user upon each usage of the resource under the resource type to obtain the recommendable content categories corresponding to the resource type; and determine, according to the number of times the second user selects each of the content categories, the recommendation weight of each of the content categories.

Optionally, the acquiring module is further configured to:
determine, according to the recommendation weight of each of the content categories, a content category whose recommendation weight is greater than a weight threshold as the target category to be recommended.

Optionally, the acquiring module is further configured to:
determine, according to the recommendation weight of each of the content categories, a preset number of content categories with the highest recommendation weight as the target category to be recommended.

Optionally, the determining module is further configured to:

determine, according to an online time of the first resource, whether the first resource is online; determine a recommendation weight of the preview category according to a maximum value of the recommendation weight of the target category if the first resource is not online and the target category does not include a preview category; and use the preview category as the target category to be recommended.

Optionally, the recommendation module is further configured to:

acquire, according to attribute information of the first resource, the second resource under the target category related to the first resource; and categorize and display entry information of the second resource on a display interface of the first resource.

Optionally, the recommendation module is further configured to:

determine, according to size of recommendation weights of content categories of the second resource, displaying areas of the content categories of the second resource in the display interface, where a displaying area of a content category having a greater recommendation weight is placed at the front; and display the entry information of the second resource under different content categories in a corresponding displaying area.

Optionally, the recommendation module is further configured to:

add, according to the content categories of the second resource, a content category identifier to the entry information of the second resource; and display the entry information of the second resource in the display interface of the first resource.

Optionally, the recommendation module is further configured to:

display voice interaction guidance information on the display interface of the first resource, where the voice interaction guidance information includes the target category; receiving voice information input by a user; perform semantic analysis on the voice information input by the user to determine a target category selected by the user; and open the second resource under the target category selected by the user.

The device provided in the embodiment of the present disclosure may be specifically used to perform the method embodiment provided in the foregoing Embodiment 2, and specific functions are not described herein again.

The embodiment of the present disclosure can achieve that different recommendable content categories flexibly correspond to a different resource type, and recommendation weights are flexibly set for the recommendable content categories corresponding to the different resource type, thus it is possible to flexibly recommended different content categories of the second resource to the user according to the resource type of the first resource currently provided to the user, moreover, when the second resource is recommended to the user, the second resource under content categories with great recommendation weights is displayed in a displaying area placed at the front, and/or the second resource is categorized and displayed by way of adding a content category identifier to entry information, so that the user can obtain the required second resource. In addition, providing the second resource to the user by way of voice interaction is more convenient and improves user experience.

Embodiment 5

Figure 6:
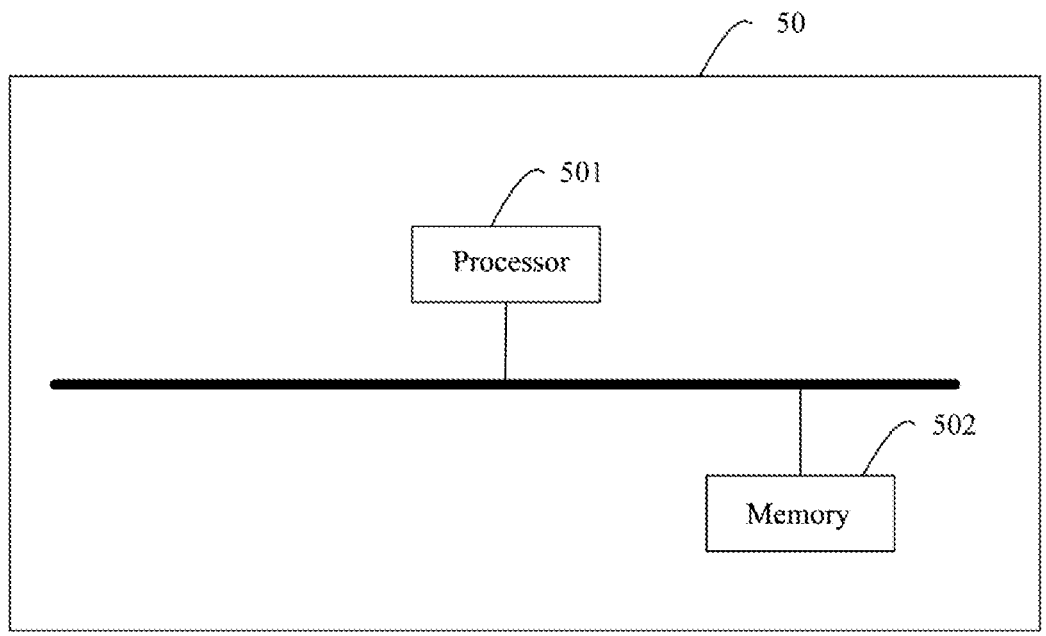
FIG. 6 is a schematic structural diagram of a resource recommendation apparatus according to Embodiment 5 of the present disclosure.

FIG. 6 is a schematic structural diagram of a resource recommendation apparatus according to Embodiment 5 of the present disclosure. As shown in FIG. 6, the resource recommendation apparatus 50 includes: a processor 501, a memory 502, and a computer program stored on the memory 502 and operable on the processor 501.

The processor 501, when running the computer program stored on the memory 502, implements the resource recommendation method provided in any of the above method embodiments.

The embodiment of the present disclosure allows for acquiring, according to a resource type of a first resource that has been provided to a first user, recommendable content categories corresponding to the resource type and a recommendation weight of each of the content categories, determining, according to the recommendation weight of each of the content categories, a target category to be recommended, and recommending a second resource under the target category to the first user, so that different recommendable content categories flexibly correspond to a different resource type, and recommendation weights are flexibly set for the recommendable content categories corresponding to the different resource type, thus it is possible to flexibly recommended different content categories of the second resource to the user according to the resource type of the first resource currently provided to the user, to better meet the user's requirements and improve user experience.

In addition, the embodiment of the present disclosure further provides a computer readable storage medium having a computer program stored thereon, where the computer program, when executed by a processor, implements the resource recommendation method provided in any one of the foregoing method embodiments.

In several embodiments provided in the present disclosure, it should be understood that the disclosed device and method may be implemented in other manners. For example, the device embodiments described above are merely illustrative, for example, the division of the units is only a logical function division, and there may be another division manner during an actual implementation, for example, multiple units or components may be combined or integrated into another system, or some features may be omitted or not implemented. In addition, the mutual coupling or direct coupling or communication connection shown or discussed may be an indirect coupling or communication connection through some interfaces, devices or units, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, functional units in embodiments of the present disclosure may be integrated into one processing unit, or the units may exist alone physically, or two or more units may be integrated into one unit. The above integrated unit can be implemented in the form of hardware or in the form of hardware plus software functional units.

The above-described integrated unit implemented in the form of a software functional unit can be stored in a computer readable storage medium. The above software functional unit is stored in a storage medium and includes instructions for causing a computer device (which may be a personal computer, a server, or a network device, etc.) or a processor to perform some of the steps of the method described in various embodiments of the present disclosure. The foregoing storage medium includes any medium capable of storing program codes, such as a USB flash disk, a mobile hard disk, a read-only memory (ROM), a random access memory (RAM), a magnetic disk, an optical disk, or the like.

It will be apparent to those skilled in the art that for the convenience and brevity of the description, only the division of the above functional modules is illustrated. In practical applications, the described functions may be assigned as desired to different functional modules for implementations, that is, the internal structure of the device is divided into different functional modules to complete all or part of the functions described above. For the specific working process of the device described above, refer to the corresponding process in the foregoing method embodiments, and details are not described herein again.

Upon consideration of the specification and practicing the disclosure disclosed herein, other embodiments of the present disclosure will be apparent to those skilled in the art. The present disclosure is intended to cover any variations, uses, or adaptations of the present disclosure, which are in accordance with the general principles of the present disclosure and include common knowledge or customary technical means in the art that is not disclosed in the present disclosure. The specification and embodiments are only to be regarded as illustrative, the true scope and spirit of the present disclosure are pointed out by the following claims.

It should be understood that the present disclosure is not limited to the precise structures that have been described above and shown in the drawings, and various modifications and changes can be made without departing from the scope the present disclosure. The scope of the present disclosure is subject only to the appended claims.

What is claimed is:

1. A resource recommendation method applied on a multimedia platform comprising a processor, wherein the method comprises:
receiving, by the processor, a request sent by a first user;
providing, by the processor, a first resource to the first user according to the request sent by the first user;
acquiring, by the processor, according to a resource type of the first resource provided to the first user, recommendable content categories corresponding to the resource type, and a recommendation weight of each of the recommendable content categories;
determining, by the processor according to the recommendation weight of each of the recommendable content categories, a target category to be recommended; and
recommending, by the processor to the first user, a second resource under the target category, and displaying entry information of the recommended second resource on a display interface of the first resource;
wherein the determining, by the processor according to the recommendation weight of each of the recommendable content categories, a target category to be recommended comprises:
determining, according to an online time of the first resource, whether the first resource is online;
if the first resource is not online and the target category does not comprise a preview category, determining a recommendation weight of the preview category according to a maximum value of the recommendation weight of the target category; and
using the preview category as the target category to be recommended.

2. The method according to claim 1, wherein the acquiring, by the processor, according to a resource type of a first resource provided to a first user, recommendable content categories corresponding to the resource type, and a recommendation weight of each of the recommendable content categories comprises:
acquiring, according to the resource type of the first resource provided to the first user, historical behavior data of a second user who has used the first resource under the resource type;
determining, according to the historical behavior data of the second user, the recommendable content categories selected by the second user upon each usage of the first resource under the resource type to obtain the recommendable content categories corresponding to the resource type; and
determining, according to a number of times the second user selects each of the recommendable content categories, the recommendation weight of each of the recommendable content categories.

3. The method according to claim 1, wherein the determining, according to the recommendation weight of each of the recommendable content categories, a target category to be recommended comprises:
determining, according to the recommendation weight of each of the recommendable content categories, a recommendable content category whose recommendation weight is greater than a weight threshold as the target category to be recommended;
or, determining, according to the recommendation weight of each of the recommendable content categories, a preset number of recommendable content categories with a highest recommendation weight as the target category to be recommended.

4. The method according to claim 1, wherein the recommending, by the processor to the first user, a second resource under the target category comprises:
acquiring, according to attribute information of the first resource, the second resource under the target category related to the first resource; and
categorizing and displaying, on the display interface of the first resource, the entry information of the second resource.

5. The method according to claim 4, wherein the categorizing and displaying, on a display interface of the first resource, the entry information of the second resource comprises:
determining, according to size of recommendation weights of content categories of the second resource, displaying areas of the content categories of the second resource in the display interface, wherein a displaying area of a content category having a higher recommendation weight is placed at a front; and
displaying, in a corresponding displaying area, the entry information of the second resource under different content categories.

6. The method according to claim 4, wherein the categorizing and the displaying, on the display interface of the first resource, the entry information of the second resource comprises:
adding, according to the content categories of the second resource, a content category identifier to the entry information of the second resource; and
displaying, in the display interface of the first resource, the entry information of the second resource.

7. The method according to claim 1, wherein the recommending, by the processor to the first user, a second resource under the target category comprises:
displaying, on the display interface of the first resource, voice interaction guidance information, wherein the voice interaction guidance information comprises the target category.

8. The method according to claim 7, wherein after the displaying, on the display interface of the first resource, voice interaction guidance information, the method further comprises:
receiving voice information input by a user;
performing semantic analysis on the voice information input by the user to determine a target category selected by the user; and
opening the second resource under the target category selected by the user.

9. A resource recommendation apparatus applied on a multimedia platform, comprising:
a memory, a processor, and a computer program stored on the memory and operable on the processor,
wherein the processor, when running the computer program, is configured to:
receive a request sent by a first user;
provide a first resource to the first user according to the request sent by the first user;
acquire, according to a resource type of the first resource provided to the first user, recommendable content categories corresponding to the resource type, and a recommendation weight of each of the recommendable content categories;
determine, according to the recommendation weight of each of the recommendable content categories, a target category to be recommended; and recommend, to the first user, a second resource under the target category, and display entry information of the recommended second resource on a display interface of the first resource;

wherein the processor is further configured to:

determine, according to an online time of the first resource, whether the first resource is online;

if the first resource is not online and the target category does not comprise a preview category, determine a recommendation weight of the preview category according to a maximum value of the recommendation weight of the target category; and use the preview category as the target category to be recommended.

10. The apparatus according to claim 9, wherein the processor is further configured to:

acquire, according to the resource type of the first resource provided to the first user, historical behavior data of a second user who has used the first resource under the resource type;

determine, according to the historical behavior data of the second user, the recommendable content categories selected by the second user upon each usage of the first resource under the resource type to obtain the recommendable content categories corresponding to the resource type; and determine, according to a number of times the second user selects each of the recommendable content categories, the recommendation weight of each of the recommendable content categories.

11. The apparatus according to claim 9, wherein the processor is further configured to:

determine, according to the recommendation weight of each of the recommendable content categories, a recommendable content category whose recommendation weight is greater than a weight threshold as the target category to be recommended;

or, determine, according to the recommendation weight of each of the recommendable content categories, a preset number of recommendable content categories with a highest recommendation weight as the target category to be recommended.

12. The apparatus according to claim 9, wherein the processor is further configured to:

acquire, according to attribute information of the first resource, the second resource under the target category related to the first resource; and categorize and display, on the display interface of the first resource, the entry information of the second resource.

13. The apparatus according to claim 12, wherein the processor is further configured to:

determine, according to size of recommendation weights of content categories of the second resource, displaying areas of the content categories of the second resource in the display interface, wherein a displaying area of a content category having a higher recommendation weight is placed at a front; and display, in a corresponding displaying area, the entry information of the second resource under different content categories.

14. The apparatus according to claim 12, wherein the processor is further configured to:

add, according to the content categories of the second resource, a content category identifier to the entry information of the second resource; and display, in the display interface of the first resource, the entry information of the second resource.

15. The apparatus according to claim 9, wherein the processor is further configured to:

display, on the display interface of the first resource, voice interaction guidance information, wherein the voice interaction guidance information comprises the target category.

16. The apparatus according to claim 15, wherein the processor is further configured to:

receive voice information input by a user;

perform semantic analysis on the voice information input by the user to determine a target category selected by the user; and open the second resource under the target category selected by the user.

17. A non-transitory computer readable storage medium having a computer program stored thereon, where the computer program, when executed by a processor, implements the steps of:

receive a request sent by a first user;

provide a first resource to the first user according to the request sent by the first user;

acquire, according to a resource type of the first resource provided to the first user, recommendable content categories corresponding to the resource type and a recommendation weight of each of the recommendable content categories;

determine, according to the recommendation weight of each of the recommendable content categories, a target category to be recommended; and recommend, to the first user, a second resource under the target category, and display entry information of the recommended second resource on a display interface of the first resource;

where the computer program, when executed by a processor, implements the steps of:

determine, according to an online time of the first resource, whether the first resource is online;

if the first resource is not online and the target category does not comprise a preview category, determine a recommendation weight of the preview category according to a maximum value of the recommendation weight of the target category; and use the preview category as the target category to be recommended.

18. The non-transitory storage medium according to claim 17, wherein the storage medium further comprises computer execution instruction which, when executed by a processor, implements the steps of:

acquire, according to the resource type of the first resource provided to the first user, historical behavior data of a second user who has used the first resource under the resource type;

determine, according to the historical behavior data of the second user, the recommendable content categories selected by the second user upon each usage of the first resource under the resource type to obtain the recommendable content categories corresponding to the resource type; and determine, according to a number of times the second user selects each of the recommendable content categories, the recommendation weight of each of the recommendable content categories.

* * * * *